United States Patent

[11] 3,620,843

| [72] | Inventor | John E. Clifford |
| | | Columbus, Ohio |
| [21] | Appl. No. | 855,649 |
| [22] | Filed | Sept. 5, 1969 |
| [45] | Patented | Nov. 16, 1971 |
| [73] | Assignee | AMP Incorporated |
| | | Harrisburg, Pa. |

[54] RECHARGEABLE CELL HAVING MOVING TAPE AND ROTATING ELECTRODES
57 Claims, 3 Drawing Figs.

[52] U.S. Cl. ................................................ 136/6, 136/86
[51] Int. Cl. ...................................................H01m 35/00
[50] Field of Search .......................................... 136/6, 90, 111–114, 86, 83, 13, 176, 175

[56] References Cited
UNITED STATES PATENTS
2,925,455  2/1960  Eidensohn et al. ........... 136/86

3,266,937  8/1966  Lyons, Jr. ..................... 136/86
3,357,864  12/1967  Huber ........................... 136/113
3,432,354  3/1969  Jost .............................. 136/86
3,438,816  4/1969  Gruber ......................... 136/111
3,536,535  10/1970  Lippincott .................... 136/86
3,479,227  11/1969  Gruber ......................... 136/86

*Primary Examiner*—Winston A. Douglas
*Assistant Examiner*—A. Skapars
*Attorneys*—Curtis, Morris and Safford, William M. Holcombe, William Hintze, William J. Keating, Frederick W. Raring, John R. Hopkins, Adrian J. LaRue and Jay L. Seitchik ABSTRACT: An electrically rechargeable cell comprising, in a charged state, an anode comprising a long steel tape coated on both sides with zinc forming the active surfaces, an aqueous electrolyte of potassium hydroxide saturated with zinc oxide and contained in and immobilized by a thin porous separator attached to each zinc surface, and two cylindrical rotatable air-permeable cathodes. The tape is driven from a storage reel to regions in contact with a substantial portion of each cylindrical cathode and onto a takeup reel, to utilize the zinc on both sides of the tape, at speeds dependent on the load current or voltage, or both. During charging, the tape is driven in the opposite direction.

PATENTED NOV 16 1971 3,620,843

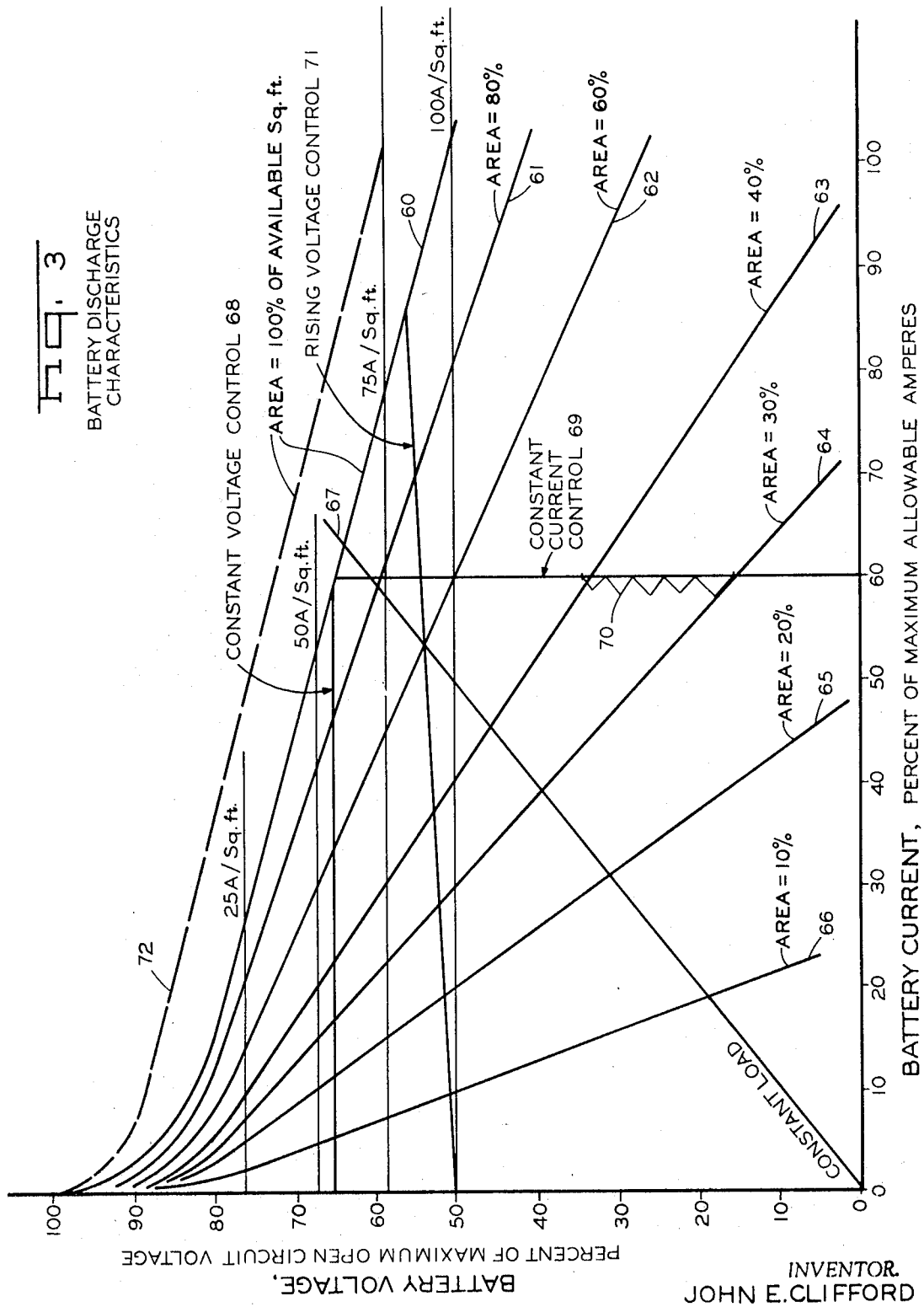

RECHARGEABLE CELL HAVING MOVING TAPE AND ROTATING ELECTRODES

BACKGROUND OF THE INVENTION

The need for secondary electric batteries having much greater energy storage capacities and substantially higher power outputs per unit weight and volume is becoming increasingly urgent. An important use for such batteries would be to supply the motive power in various types of vehicles now commonly driven by internal combustion engines, so as to reduce air pollution and possibly costs as well. A particular requirement of motive power batteries is high-power density capability combined with high-energy density in an economical manner. A capability for high-peak-power density for short intervals of time associated with demands of acceleration and hill climbing in vehicular propulsion is also a desirable feature for certain motive power batteries. The present invention provides improved rechargeable current generating cells that can be connected to provide batteries to meet these requirements.

SUMMARY OF THE INVENTION

A typical rechargeable current generating cell according to this invention comprises a. a first electrode having a substantially cylindrical active surface,
b. a movable elongated member comprising
   i. a thin flexible conductive current collector,
   ii. a second electrode comprising a layer of active material on the collector, and
   iii. a layer of porous nonconductive material on the second electrode and substantially saturated with an electrolyte,
c. means for positioning a portion of the elongated member adjacent the first electrode with the electrolyte layer contacting a substantial portion of the cylindrical active surface of the first electrode,
d. means for storing a substantial portion of the elongated member in regions away from the first electrode, and
e. means for moving the elongated member to progressively change the specific portion thereof that is positioned adjacent the first electrode.

The elongated member (b) may comprise also a third electrode as in (ii) on the opposite side of the collector (i) and a second electrolyte layer as in (iii) on the third electrode; in which case a fourth electrode as in (a) is provided, means are provided for positioning a portion of the elongated member adjacent the fourth electrode with the second electrolyte layer contacting a substantial portion of the cylindrical active surface of the fourth electrode, and the moving means (e) also progressively changes the specific portion of the elongated member that is positioned adjacent the fourth electrode. The collector preferably is wider than the second and third electrodes and the electrolyte layers, and means are provided for making electrical connection to an exposed area on the collector. The collector preferably consists essentially of a material that is electrochemically inert in the electrolyte. The cell may comprise also a layer of porous nonconductive material on the first and fourth electrodes and substantially saturated with an electrolyte. The electrolyte layers on the second and third electrodes may then be omitted, if not desired.

Typically, the moving means (e) also rotates the first electrode so that it and the adjacent portion of the elongated member move together with no relative motion therebetween. The fourth electrode is moved in the same way. The electrical connection making means may also rotate with the first and fourth electrodes adjacent respective progressively changing portion of the exposed area on the collector so as to move together with the respective adjacent collector portions with no relative motion therebetween.

The electrolyte layer preferably is about 2 to 10 mils thick and is pressed snugly against the first electrode to provide close spacing between the first electrode and the adjacent portion of the second electrode.

In preferred forms of the cell, the first and fourth electrodes are cathodes and the second and third electrodes are anodes. The opposite arrangement may also be used, where the first and fourth electrodes are anodes and the second and third electrodes are cathodes. Each cathode typically comprises a gas-permeable member, preferably an air-permeable conductive member, which may have catalytic material thereon. Where a gas-permeable cylindrical cathode is used, a progressively changing portion of it is positioned away from contact with the elongated member and means are provided for forcing a gas through said portion of the cathode to purge it.

Means may be provided for supplying direct current between the first and fourth electrodes and the flexible current collector, to charge the cell. Alternatively, the cell may include first conductive means contacting the electrolyte layer (b) (iii) in a region away from contact with the first electrode (cathode), second conductive means contacting the second electrolyte layer in a region away from contact with the fourth electrode (cathode), and means for supplying direct current between both of the conductive means and the flexible current collector, to charge the cell. The positioning means may include cylindrical rollers having conductive surfaces to provide the conductive means used as auxiliary electrodes in charging.

Means may be provided for controlling the speed of movement of the elongated member, as by continuously adjusting the speed of movement so as to provide preselected voltages across, and currents through, the cell over a range of settings of a command device. Typical control means includes a servomechanism, and is responsive to the instantaneous voltage or current to maintain at least one of them substantially at values selected as a function thereof and of adjustable settings of the command device. The moving means drives the elongated member mostly in one direction when the cell is being discharged and in the opposite direction when it is being charged.

In a typical cell, with the cell in a charged state, the electrolyte is alkaline, the active anode surface consists essentially of iron oxide, cadmium, or zinc, and the active cathode surface consists essentially of nickel oxide or silver oxide; more specifically, the electrolyte may consist essentially of potassium hydroxide, and the active anode surface and the active cathode surface respectively may consist essentially of iron oxide versus nickel oxide; cadmium versus silver oxide; or zinc versus silver oxide. In an acid-type cell, with the cell in a charged state, the electrolyte may consist essentially of sulfuric acid, the active anode surface may consist essentially of lead, and the active cathode surface may consist essentially of lead oxide.

In a preferred form of the cell, with the cell in a charged state, the active anode surface consists essentially of zinc, preferably as a coating of about 5 to 25 (typically 15) grams per square foot of zinc on a steel tape about 1 to 5 mils thick; and the electrolyte is an aqueous solution consisting essentially of at least about 30 percent potassium hydroxide, which may be saturated with zinc oxide. The coating should be about 5 to 25 grams of zinc per square foot of cathode area where the anode is cylindrical (first and fourth electrodes) and the cathode is on the tape (second and third electrodes). The cathode preferably comprises a conductive screen for use as an air electrode, and may have on it a catalyst comprising essentially platinum or silver. Another usable cathode may comprise a conductive backing member having thereon an active cathode surface consisting essentially of silver oxide, preferably as a coating of about 10 to 50 (typically 30) grams per square foot of silver oxide. The coating should be about 10 to 50 grams of silver oxide per square foot of anode area where the cathode is cylindrical (first and fourth electrodes) and the anode is on the tape (second and third electrodes).

In one preferred cell the first electrode is a cathode comprising an air-permeable member, which may consist essentially of porous carbon, the second electrode is an anode with its active material consisting essentially of zinc, and the electrolyte consists essentially of potassium hydroxide. The spacing between the cathode and the anode, as determined by the electrolyte layer, is less than 25 mils. Where third and fourth electrodes are included, the third is an anode similar to the second, the fourth is a cathode similar to the first, and the same electrolyte and spacing are provided.

BRIEF DESCRIPTION OF THE DRAWINGS

FIG. 3 is a graph illustrating the operation of typical means for controlling the speed of the elongated member in the cell of FIG. 1.

DESCRIPTION OF THE PREFERRED EMBODIMENT

Figure 1:
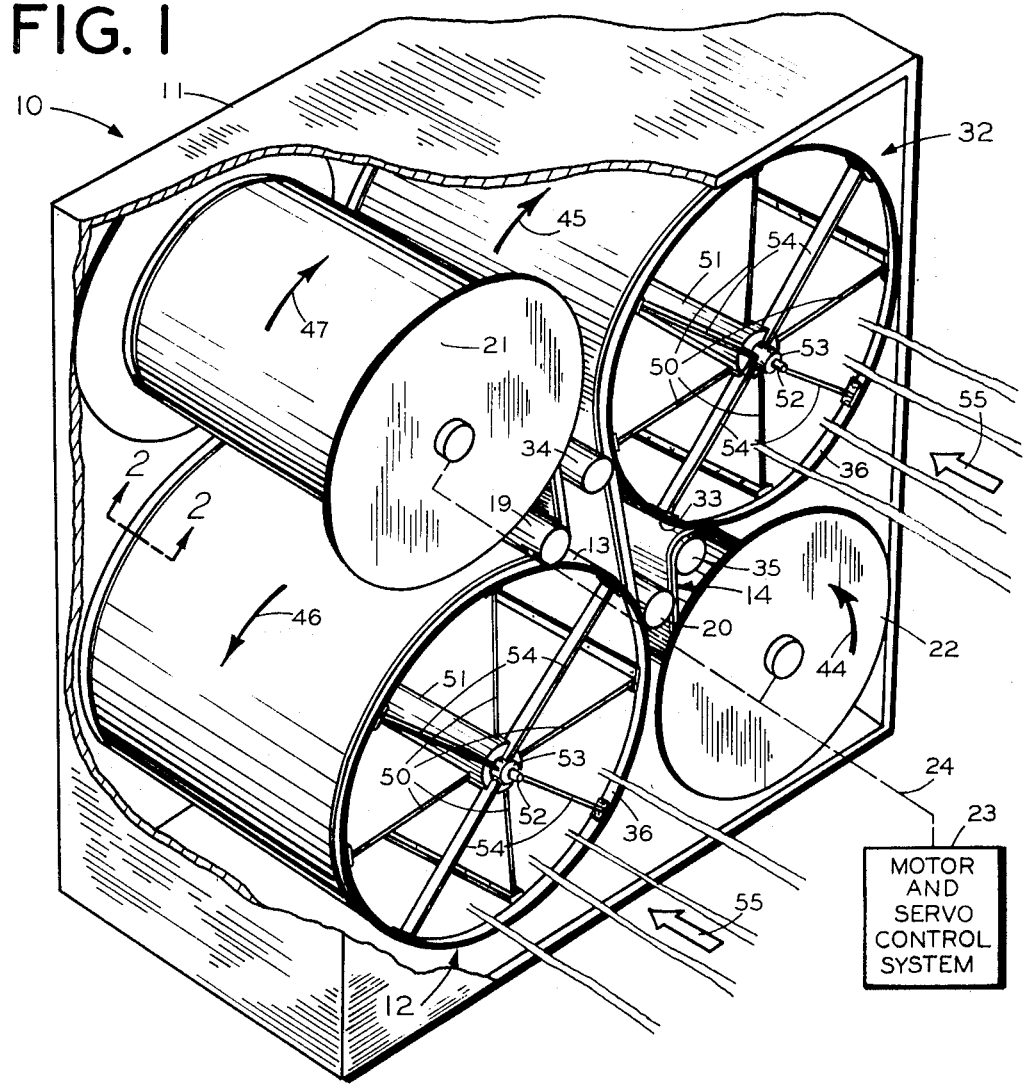
FIG. 1 is an isometric view, with portions cut away, of a typical rechargeable cell according to the present invention.
Figure 2:
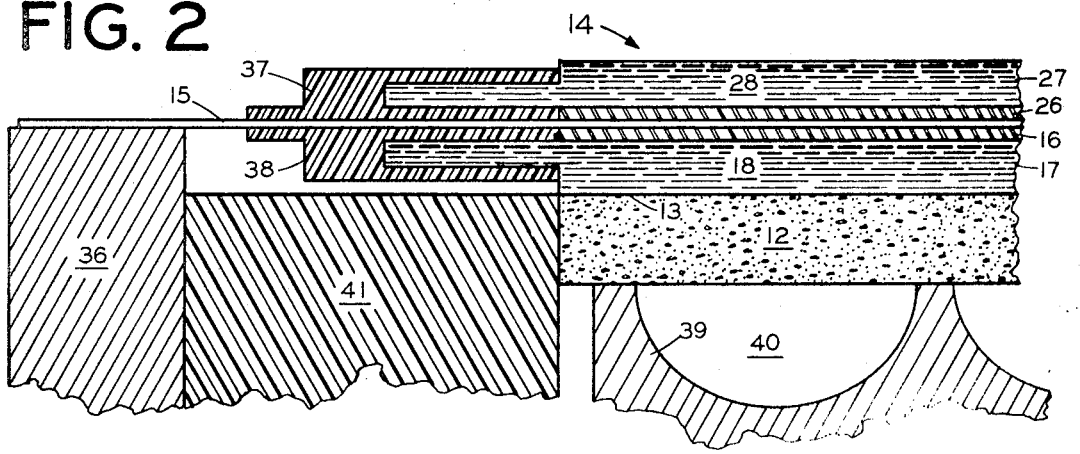
FIG. 2 is an enlarged sectional view of a portion of the cell, taken in the plane 2—2 in FIG. 1.

A typical rechargeable-current-generating cell 10 according to this invention as shown in FIG. 1 includes a housing 11 wherein are mounted the other components. The cathode 12 has a substantially cylindrical active surface 13, only a small portion of which is visible in FIG. 1. Referring also to FIG. 2 for details, a movable elongated member 14 comprises a thin flexible conductive current collector 15, on which is a layer of active material forming an anode 16. On the anode 16 is a layer 17 of porous nonconductive material substantially saturated with an electrolyte 18. Rotatable rollers 19 and 20 maintain a portion of the elongated member 14 in position adjacent the cathode 12 with the electrolyte layer 17 contacting a substantial portion of the active cathode surface 13 around which it is wound.

A supply reel 21 and a takeup reel 22, around which most of the elongated member 14 is wound, store the portions of the elongated member 14 thereon in regions away from the cathode 12. A motor 23, shown schematically with a servocontrol system in FIG. 1, mechanically drives the rotatable takeup reel 22 or the rotatable supply reel 21, as is indicated at 24, to progressively change the specific portion of the elongated member 14 wound thereon and around the cathode 12 to progressively change the specific portion that is positioned adjacent the cathode 12. The direction and speed of movement at any given instant are determined by the servocontrol system. The motor and servocontrol system 23 may include a reversible motor and means for selectively causing it to drive either the takeup reel 22 or the supply reel 21, or it may include a separate motor for each reel with the servocontrol system determining which is to operate at any given instant and the speed of rotation. Such motors may be mounted on the housing 11, or even inside the reels 21 and 22. Other arrangements may, of course, be substituted if desired.

The capacity of the cell 10 as described so far can be increased 100 percent with only a much smaller percentage increase in cost, size, and weight by adding the other components shown in FIGS. 1 and 2 to provide an additional cathode, anode, and electrolyte. The elongated member 14 does double duty when it is provided with a second anode layer 26 similar to the first anode layer 16 on the opposite side of the collector 15 and a second layer 27 substantially saturated with an electrolyte 28 on the second anode 26. A second cathode 32, similar to the first cathode 12, is provided as shown in FIG. 1 having a substantially cylindrical active surface 33 only a small portion of which is visible in FIG. 1. Rotatable rollers 34 and 35 maintain a portion of the elongated member 14 in position adjacent the second cathode 32 with the electrolyte layer 27 contacting a substantial portion of the active cathode surface 33 around which it is wound. The housing 11, the reels 21, 22, and the rollers 19, 20, 34, 35 may be made of plastic or other strong, tough insulating material.

The motor and servocontrol system 23, by rotating the reels 21 and 22 selectively, of course, progressively change the specific portion of the elongated member 14 and the second anode 26 and the second electrolyte layer 27 thereon that are positioned adjacent the second cathode 32, just as it progressively changes the specific adjacent portions of the cathode 12 and the anode 16.

As is apparent from FIG. 2, the conductive current collector 15 is wider than the anodes 16, 26 and the electrolyte layers 17, 27 thereon, preferably along both longitudinal sides, and a conductive anode current connector ring 36 makes electrical connection to an exposed area along each longitudinal side of the current collector 15. Insulators 37 and 38 near each longitudinal edge of the current collector 15 insulate it from any possible contact with the cathodes 12 and 32. A cathode support and current connector 39 has air passages 40 adjacent the active cathode region 12. The passages 40 are actually many times bigger than they appear in FIG. 2, which is not drawn to scale because the entire sheet of drawing is too small to show details of the components with the air passages 40 drawn to the same scale. The cathode 12 and its current connector 39 are attached to one side of an insulator 41 on the opposite side of which is mounted the anode current connector 36. Since the anode current collector 15 is connected to both of the anodes 16 and 26, it is convenient to connect the two cathodes 12 and 32 together also, and the current generating cell 10 thus comprises two smaller cells connected in parallel. (To permit connection of the two smaller cells in series, the movable elongated member 14 can be modified by replacing the current collector 15 with two such collectors having a layer of insulation between them.)

When the cell 10 is discharging the motor and servocontrol system 23 mostly rotates the takeup reel 22 in a counterclockwise direction as indicated by the arrow 44, causing the elongated member 14 to rotate the second cathode 32 in a clockwise direction as is indicated by the arrow 45, while also causing the first cathode 12 to rotate in a counterclockwise direction as indicated by the arrow 46 and causing the supply reel 21 to rotate in a clockwise direction as indicated by the arrow 47. During charging of the cell 10, the motor and servocontrol system 23 mostly rotates the supply reel 21 in a counterclockwise direction, causing it to pull the elongated member 14 in the opposite direction from that shown in the arrow 47 and thus rotating the first cathodes 12 and 32 and the takeup reel 22 in the opposite directions from those shown by the arrows 46, 45, and 44.

During discharging, the reaction at the anode 16, 26 is $2Zn+4OH^- \to 2ZnO+2H_2O+4e$; the reaction at the cathodes 12, 32 is $O_2+2H_2O+4e \to 4OH^-$; and the overall reaction is $2Zn+O_2 \to 2ZnO$. The electrolyte 18, 28 remains unchanged.

During charge, the reaction at the anodes 16, 26 is $4e+2ZnO+2H_2O \to 2Zn+4OH^-$; the reaction at the cathodes 12, 32 is $4OH^- \to O_2+2H_2O+4e$; and the overall reaction is reversed: $2ZnO \to 2Zn+O_2$. The electrolyte 18, 28 is unaffected, zinc is reformed on the anodes 16, 26 and oxygen escapes to the atmosphere through the outlet ends of the air passages 40.

In a typical cell 10 the elongated member 14 is about 22 feet long and 6 inches wide. It is wound on a supply reel 21 about 5 inches in diameter, and is threaded around the roller 19 and the first cathode 12, under the rollers 20 and 34, around the second cathode 32 and the roller 35, and onto the takeup reel 22. The elongated member 14 comprises a flexible steel tape 15 about 1 mil thick covered on each side with about 1 mil of porous spongy zinc 16, 26 (the anodes), and an outside covering on each side about 5 mils thick of a porous separator material 17, 27 such as cellophane or asbestos paper saturated with potassium hydroxide electrolyte 18, 28. Both outside edges of the tape 15, for a width of about ⅛ inch each, are bare of any covering and make electrical contact with the anode current connectors 36.

Each cathode 12, 32 may comprise a cylinder about 6 inches in diameter and 6 inches long of fine mesh wire screen into which is pasted a mixture of powdered carbon, powdered graphite, powdered polytetrafluoroethylene, possibly a catalyst such as platinum or silver, and a binder, having a total thickness of about one thirty-second inch. The inside of the cylinder may be coated with a thin layer of porous hydrophobic polytetrafluorethylene. Four finlike metal spokes 50 extending the length of each cylinder connect the screen of the air cathode 12,32 to a central hollow conductive metal shaft 51, which supports the cylinder and acts as a current connector. One end of the hollow shaft 51 extends outside the housing 11, serving as a positive terminal. At the other end a smaller solid conductive metal shaft 52 extends outside the housing 11 and serves as a negative terminal. The inner shaft 52 is insulated from the outer shaft 51 by a sleeve of insulating material 53. Four flat rodlike spokes 54 at each end of each cylinder extend from the inner solid shaft 52 to the current connector rings 36, which form the extreme end portions of each cylinder and are insulated from the cathodes 12,32 by the annular-shaped insulators 41. The connector rings 36 contact the outside one-eighth inch clear edges of the anode collector tape 15 as it moves with and around the cathodes 12,32.

The guide rollers 19, 20, 34, 35 hold the tape 14 with the electrolyte layers 17,27 pressed snugly against the cathodes 12,32 to provide close spacing between each cathode surface 13,33 and the adjacent portion of the anode 16,26. The cathodes 12,32 and the adjacent portions of the tape 14 move together with no relative motion therebetween as in ordinary belt and pulley mechanisms. Slippage usually is no problem, but a positive drive can be assured if desired by providing projecting teeth around each edge of the cathode cylinders, as on the anode current connector rings 36, and corresponding performations along each longitudinal edge of the tape 14. At any instant the tape 14 covers approximately 330° around each cathode 12,32 while about 30°, as shown at 13 and 33, is left uncovered so that air and any trapped nitrogen can freely pass through from the inside to the outside of the cylinder.

During operation of the cell 10, air is supplied under pressure as indicated at 55,55 to the inside of the cathodes 12,32. The oxygen in the air reacts at the cathodes 12,32 where the electrolyte 18,28 in the electrolyte layers 17,27 on the tape 14 is in contact with the cathodes 12,32 as the air penetrates their pores at the surfaces 13,33. Meanwhile each zinc anode 16,26 reacts with the electrolyte 18,28, completing the cell reaction and providing electrical energy at the cell terminals 51,52. As the energy is consumed by a load, which may vary, as where the cell provides power to drive a vehicle, the variable speed motor and servocontrol system 23 drives the tape 14 and the cylindrical cathodes 12,32 in the proper direction and speed by selectively driving the takeup reel 22 or the supply reel 21 through a suitable geartrain or other connection as indicated schematically at 24. Thus the fresh zinc of the anodes 16,26 is continuously replenished as required by the power demand, which may be as much as 300 watts for each cell 10. After all of the tape 14 has been wound onto the takeup reel 22, the cell 10 is substantially discharged.

The original charge of zinc in the anodes 16,26, approximately 0.8 pound, is oxidized during discharge of the cell 10 to approximately 1 pound of zinc oxide in the same anode layers 16,26 of the tape 14 stored on the takeup reel 22. To recharge the cell, the tape 14 is driven in the opposite direction by the motor and servocontrol system 23 through the supply reel 21 while electrical energy is supplied from a direct current source to the cell terminals 51,52 to convert the zinc oxide back to zinc and to liberate the oxygen.

When catalysts such as platinum black are used to enhance the performance of the cathodes 12,32 in discharging, the life of the cathodes is reduced if they are used also in charging. To avoid this, auxiliary electrodes may be provided for charging. The cylindrical surfaces of the rollers 19, 20, 34, and 35 may be made of suitable conductive material, such as porous platinum or platinum alloys, porous carbon with no catalyst, or other porous conductors that will not deteriorate during charging; and may be used as the auxiliary electrodes. Supplying direct current between at least one of the rollers 19,20 and the tape 15 reactivates the anode 26 and the electrolyte 28, and thus charges the cell on one side. Supplying direct current between at least one of the rollers 34,35 and the tape 15 similarly charges the cell on the other side.

With the air for the cathodes 12,32 supplied as described above, the cathode current connector 39 may comprise a fine screen or other thin perforated conductive member. Efficiency can be increased, however, by shaping the cathode current connector 39 as shown in FIG. 2, and supplying air under pressure through the air passages 40, which preferably run parallel to the axis of each cylinder from one end of each cathode 12,32 to the other. (As shown in FIG. 2, the air passages 40 are rotated 90° from their preferred position for convenience in showing the semicircular cross section of a typical passage.) Part of the air supplied under pressure at one end of each air passage 40 penetrates into the cathode 12 or 32 and is forced on by the pressure in the general direction of the passages 40 to the other end of the cylinder and out the other ends of the passages 40.

A progressively changing portion of the cathode 12, in the short region indicated at 13 between the rollers 19 and 20, is positioned away from contact with the elongated member 14. In this open region, the air supplied under pressure from inside the cylinder passes through the cathode 12 removing inert matter therefrom, and thus purging it. The progressively changing portion of the cathode 32, in the short region indicated at 33 between the rollers 34 and 35, is purged in the same manner.

Air can bubble through each air cathode on that portion which is not covered by tape. The fact that the air cathode is not completely covered is important because the air bubbling through serves to purge the air cathode of inert gases (e.g. nitrogen). Since the air cathode is purged once each revolution of the cylinder there is an advantage over the static cells which do not permit such a purge.

Not only does the air bubble through the electrolyte retained in the porous air cathode. Thus there is not the problem of separating air from the electrolyte that exists in other batteries that use a free electrolyte. Also the air bubbling through the cathode does not occur in the active electrolysis zone as in free electrolyte designs in which the entrained air in the electrolyte between the electrodes increases the ohmic resistance.

As can be seen in FIG. 1 by the relative direction of motion of tape and air cathode, the purge of the air cathode occurs just ahead of the contact of fresh tape with the cylinder. Fresh zinc and freshly purged air cathode combine to provide the most conducive conditions for discharge at the entry under normal discharge rate conditions. The highest current density is achieved near the entry and the local current density diminishes as the tape proceeds around the periphery from the entry in the direction of rotation. The decrease in current density in the direction or rotation that would occur during normal operation at moderate discharge rates is the result of two factors: increase in the thickness of insoluble zinc products and polarization of the air cathode. The latter occurs to some extent as nitrogen accumulates in the pores of the air cathode and also as any initial dissolved oxygen in the electrolyte is consumed and a steady state is established for mass transfer of oxygen. The latter is usually a transient effect of little consequence in normal air cathode operation. However, the present invention not only provides for periodic purge of the air cathode to remove nitrogen but the bubbling also provides for resaturation with oxygen of the electrolyte in the air electrode. In a unique manner this resaturation occurs while a portion of the air cathode is "relaxing" (electrochemically speaking). No electrolysis is taking place at the portion of the air cathode that is being purged. This effect is quite similar to what would happen in free-electrolyte cells if the current was interrupted periodically and air bubbling continued. In general, such interruption of current is considered to have a net beneficial effect in reduction of concentration polarization. However, periodic current interruption is not practical for batteries. A similar effect is sometimes achieved in certain electrochemical operations by use of superimposed alternating current or special wave forms, but these methods are not applicable to batteries. Thus, one of the unique features of the present invention is the provision for air cathode "relaxation" to reduce concentration polarization *without any interruption of the current output from the battery*.

The periodic relaxation and restoration of the air cathode has a beneficial effect at normal discharge rates. However, the greatest benefit is attained when it is desired to achieve peak current output from the battery. When load conditions demand peak current, the control system automatically increases the speed of tape advance. This increases the rate at which fresh zinc surface is exposed and simultaneously increases the ate at which the most highly active cathode surface (freshly purged) is brought into the active electrolysis zone. Thus, when the need arises the most ideal anode and cathode surfaces are brought into the active electrolysis area to achieve the peak power output of the battery. This condition can be maintained as long as the load conditions demand. This type of optimum utilization of active materials for peak power is unique to the present invention and is not possible with zinc/air cells of the prior art.

Furthermore, the attainment of identical optimum electrode conditions for peak power can be achieved at any time during the discharge cycle that the external load requires peak power. This is another unique feature of the present invention because rechargeable batteries of the prior art suffer a characteristic decrease in peak power capability throughout the discharge cycle (i.e., it is not possible to obtain as high a peak current toward the end of discharge as with a freshly charged battery). This limitation of batteries of the prior art requires that peak power capability be defined as the *minimum* capability within the useful discharge time. In contrast, the present invention provides for a uniformly high peak power capability throughout the discharge cycle and provides many practical benefits.

Typical outside dimensions of the housing 11 are 1 foot by 1 foot by 7 inches. The housing 11 may be made of any suitable strong, tough, impact-resistant material, preferably a good insulator, such as polyethylene or other plastic stiffened internally with a metal such as aluminum. A typical cell 10 weighs about 5 pounds and stores approximately 300 watt-hours of electrical energy (about 60 watt-hours per pound, 500 watt-hours per cubic foot). A typical battery of 100 cells thus provides about 30 kilowatt-hours in 60 cubic feet at a weight of about 500 pounds.

Speed Control

The motor and servocontrol system 23, as in FIG. 1, controls the speed of the tape 14 during discharging and charging of the cell 10 by means of its mechanical connection 24 to the reels 21 and 22. The speed control is variable from zero to the maximum speed desired, say about 12 inches per minute. The speed is arranged to be proportional to the input commands and the output condition of the battery as determined by the load on the cell at any instant. The output condition of the cell is measured and compared with the input command signals. An error signal is thus derived and fed back to the tape drive motor to cause it to speed up, slow down, stop, or reverse direction as required by the instantaneous demands of the load. This is the application of conventional feedback servomechanism technology to battery output control.

This can be done only because of a unique feature of the tape battery as compared to conventional plate batteries; namely, that the active area of the tape battery is a variable which can be controlled. Consider the battery cell 10 of FIG. 1 with the tape motionless. The active electrode areas are the lengths of the anode tape 14 positioned adjacent the cathodes 12,32 times the width of the anodes 16,26. Now apply a load to the battery cell 10 and adjust the tape speed so that all of the zinc converts to zinc oxide just as the anodes 16,26 leave the cathodes 12,32. For this particular load current we are now using the *maximum* available electrode *area* and consequently are drawing *minimum* current *density* as measured, say, in amperes per square foot. We also have maximum battery voltage for this particular load current. Now slow the tape down to one-half its former speed. To maintain the same load current the same quantity of zinc has to be converted since coulombs are proportional to the weight of the reactant and the current, coulombs per second, is assumed to be the same for both tape speeds. Since we are now introducing the reactant at half its former rate and are converting it at the same rate, it is completely converted by the time it reaches half the distance from the tape input to the cathodes to the tape output from the cathodes. In effect, we now have a one cell battery having only half its former active electrode area. It is this unique feature of active electrode area variable with tape speed that provides the advantage of servomechanism control of output voltage and current.

FIG. 3 shows a normalized family of battery discharge characteristic curves 60—66 for a typical tape battery having a number of cells 10 in series for some nominal open circuit output voltage normalized to 100 percent and a maximum power transfer output of 100 percent of maximum allowable amperes at 50 percent voltage. Each cell has a tape area normalized to 100 percent of maximum and all tapes are driven in synchronism. As the active area is reduced in going from curve 60 to curve 66 the negative slope increases, as is to be expected with the increase of internal battery resistance with reduced electrode area.

A constant load line 67 is shown on these characteristics, running from 0,0 to the area = 100 percent available sq. ft. characteristic, curve 60, at 63 percent (volts) and 63 percent (amperes). For this constant resistance load, as the tape is slowed down, the active area is reduced, the current density increases, and both the output voltage and current fall, such that at area = 60 percent (sq. ft.) the battery output is 53 percent (volts), 53 percent (amperes); at area = 30 percent (sq. ft.) it is 39 percent (volts), 39 percent (amperes); and at area − 10 percent (sq. ft.) it is 19 percent (volts), 19 percent (amperes).

If we impose the servocontrol system 23 and command it for constant voltage at 65 percent (volts) we have the operating line 68, for constant voltage control. As the load current changes with external conditions from 0 to 57 percent (amperes) the servocontrol 23 speeds the tape 14 up proportionately, providing more and more active area to maintain the voltage (and the current density) constant until the maximum speed and active area characteristic curve is reached at 65 percent (volts) and 56 percent (amperes). If the current increases beyond 57 percent (amperes), the battery will provide it but the voltage will decrease, as in the ordinary battery, along the characteristic curve 60 until 100 percent (amperes) (the maximum allowable battery current) and 50 percent (volts) are reached.

If we command the servocontrol 23 for constant current at 60 percent (amperes) we get the operating line 69, running from zero volts, 60 percent (amperes), to 64 percent (volts), 60 percent (amperes). As the load changes from 0 resistance to larger values due to external conditions, the servocontrol 23 speeds up the tape 14 to provide the greater voltage needed to drive the same current through the larger resistance. This continues until the maximum area characteristic curve 60 is reached at 64 percent (volts). If the resistance increases further the current will fall off and the voltage will increase along the characteristic curve 60 until zero current is reached at 100 percent (volts). The way the servo accomplishes this control is shown at 70. Starting at 60 percent (amperes), 15 percent (volts), the resistance increases slightly. At first the current falls off to about 58 percent (amperes). This provides enough error signal for the servo to speed up the tapes and restore 60 percent (amperes) at 20 percent (volts). As the resistance continues to increase, the current again falls off to about 58 percent (amperes), the servo again speeds up the tapes and equilibrium is again established at 23 percent (volts), 60 percent (amperes). This action continues until equilibrium is established at 33 percent (volts), 60 percent (amperes). Actually the error signal necessary is much less than 2 percent (amperes) and the current is maintained at very nearly 60 percent (amperes).

Another control line is shown at 71 as a rising voltage control. By servo action as described above the battery output follows this line to its intersection with the maximum characteristic curve 60 for area = 10 percent (sq. ft.), and then follows this curve to 100 percent (amperes). The servo speed control 30 can be built to allow selection of any of these lines or any other line on these characteristics, or even combinations of these lines such as the combination of constant voltage control 68 and constant current control 69.

This unique ability of the tape battery to have a servo controlled output characteristic curve subject to input commands can be very useful as, for instance, in the control of DC motor speed and power. This comes about because by servocontrol we can not only select an operating line as described above but also select by command input the particular point on the line at which we wish the equipment to operate.

Another unique ability of the cell 10 is shown in FIG. 3 by the curve 72 which represents a characteristic of the cell existing when the tape is moved fast enough to maintain nearly 100 percent active anode zinc in position against the cylindrical cathode. This is to be distinguished from the family of curves 60 through 66 which are average characteristics as described above wherein the anode zinc is substantially 100 percent used when it reaches the exit edge. In the case represented by the curve 72, higher currents are drawn at higher voltages when peak power is needed, at the expense of allowing some unconsumed zinc to leave the exit area.

When the cell is being charged, the servocontrol system 23 operates in a similar manner to that described above. The command setting is adjusted to provide control responsive to the charging voltage and the current through the cell such that all of the zinc oxide of the anodes 16,26 is converted to zinc just before the tape 14 pulls away from the adjacent cathodes 12,32 as it is driven back onto the supply reel 21. Such control provides optimum efficiency and economy in charging the cell and provides a long useful cell life.

A particular advantage of the use of a cylindrical rotating assembly is that sliding friction is avoided. There is no relative movement between the separator 17 and the air cathode 12, which is important to minimize wear or damage to either the separator or air cathode during repeated cycles of charge and discharge. In addition, there is no relative motion between the steel tape current collector 15 and the anode current connector 36, which is an integral part of the air cathode assembly. Thus, the steel tape 15 makes positive contact to the cylindrical current connector 36 during the time that current is passing between the two. Since there is no relative motion at the point of electrical contact, there is no sliding frictional resistance. By minimizing sliding friction, there is negligible resistance to movement of the tape during charge or discharge and control of tape movement is easily accomplished with a minimum expenditure of energy.

Internal cell resistance leads to loss of power relative to that which is theoretically possible for an electrochemical couple. Minimizing internal losses is essential for high power density cells required for batteries for motive power applications. The present invention provides the means for reducing power losses associated with current collection, electrolyte resistance, anodic polarization, and cathodic polarization as discussed below.

The steel tape 15 performs the function of collecting the current from the zinc anodes 16,26 during support and distributing the current during charge. Therefore the tape 15 must be a good conductor of electrons. In addition the tape should be electrochemically inert in the electrolyte used, so that it will not be electrochemically consumed during discharge. This latter feature is essential for a practical rechargeable cell because in the fully discharged condition (all zinc oxidized) the anodic products are poor electronic conductors. The tape 15 serves as an electrode to permit the initial reduction of anodic product to zinc. The elemental zinc is conductive and contributes to current distribution after it is formed. However, the steel tape 15 is essential to guarantee that initial local charging can occur. A further property of the tape 15 is that it be flexible so as to pass over the various rolls and be capable of withstanding repeated reversed flexing during numerous charge and discharge cycles. A thin tape provides for flexibility and the need for a thin tape is also dictated by the desire to minimize weight of all cell components that do not directly provide electrochemical power.

A significant feature of the present invention is that the same steel tape 15 functions as electrode and cupport for zinc as active anode material 16 on one side of the tape 15 in one cell and subsequently performs the same function of electrode and support for zinc as active anode material 26 on the opposite side of the tape 15 in another cell electrically connected in parallel. Thus the feature of providing zinc on both sides of the tape and the arrangement of two cylindrical air cathodes and the method of threading the tape through the cell for efficient utilization of all active material provides a significant reduction in the weight of inert tape that would be required if only one side of the tape were used. The configuration of the tape with regard to thickness and width in relation to the electrical conductivity of the tape is dependent on the current density with reference to the zinc surface on only one side of the tape. The thickness of tape is also a function of the distance the current has to travel in the tape. For the preferred configuration where the peripheral length of the cylinder is large with respect to the width, it is desirable that current be removed from the tape along its edge so that the minimum thickness of steel tape can be used. By removing current from both edges, the tape can be made even thinner for the same voltage drop in the tape. Although there is added weight for peripheral anode current connectors on both ends of each cylinder, there is a net reduction in weight when long tapes are used. For a particular cell energy capacity (amount of zinc provided) and a particular cylinder dimension which determines the discharge current density, a long tape 15 is desired to minimize zinc layer thickness 16,26 and equivalent electrolyte layer thickness 17 so as to make the interelectrode distance small between the anode 16,26 and the cathode 12,32 in the active electrolysis zone.

To illustrate how the present design saves weight, an analogy can be made to the usual practice of constructing static cells with a rectangular thin grid support structure in a heavier picture frame border. For the tape cell, the peripheral anode connector rings 36 on the cylinder ends are analogous to the "picture frame" and the steel tape 15 wrapped around the cylinder is analogous to the "grid structure." However, by the present invention one "picture frame" is rotated and used over and over many times to conduct current from the steel tape "grid." Thus, in contrast to conventional cell construction, the weight of the heavier "picture frame" border of the present cell design is independent of the tape length (total anode area).

Considerations such as discussed above are typical of the weight savings made possible by the present invention and illustrate one of the unique design features of the tape battery; namely, that design for high power (kilowatts) can be optimized independent of design for high energy (kilowatt-hours). For example, the design of the air cathode structure and current connectors on the cylinder and tape design (thickness of steel tape, zinc, electrolyte, and separator) determine the power attainable. The length of the tape determines the total energy available and the total tape length can be varied as needed for the application without influencing the power capability. In battery designs of the prior art there was always a necessity of compromise between design for high power and design for high energy.

An important feature of the present invention is the small anode to cathode spacing that can be achieved in the active electrolysis zone. The resulting low ohmic resistance permits current densities far in excess of that obtainable from cells designed according to the prior art. This can be shown by an application of Ohm's Law to reasonable estimates of the interelectrode spacing for various call designs.

$$E_3 = IR = \rho g i$$

where $E_3$ = voltage drop through the electrolyte, volts
$I$ = current, amperes
$R$ = resistance of electrolyte, ohms
$\rho$ = resistivity of electrolyte, ohm-inch
$g$ = electrode spacing, inch
$i$ = current density, amp/in.$^2$ For the zinc/air couple the spacing $g$ is dependent on the design of the zinc anode. For simplicity consider a unit area of air cathode and consider the distance $g$ to include the thickness of zinc and associated electrolyte plus separator. For the preferred embodiment of the invention, the zinc thickness is about 0.001 inch and the amount of electrolyte required for anodic dissolution of this thickness of zinc would have a thickness of about 0.0022 inch based on the factor of 0.4 gram of electrolyte (as an aqueous solution of 30-weight percent KOH) per gram of zinc. The electrolyte plus porous separator is estimated to have a thickness of about 0.005 inch uncompressed and 0.004 inch when compressed on the air cathode in the active electrolysis zone. Thus, the spacing $g$ is about 0.005 inch. Generally speaking most electrochemical cells have the geometric area of cathode and anode facing each other in the active electrolysis zone. However, for the tape battery the total anode area, including zinc on the storage reel, can be many times the active cathode area, depending on the design capacity of the battery. For example, assume the ratio of total anode area to cathode area is 15. To provide equivalent capacity (zinc) in cells according to the prior art where the anode and cathode areas are equal it would be necessary to provide a zinc layer of at least 0.015 inch and electrolyte thickness of about 0.033 inch for a total of 0.048 inch. Anodic dissolution of a thick layer of zinc is difficult because of the large thickness of insoluble zinc products that would accumulate between the electrodes. One solution according to the prior art is to pump fresh electrolyte through the space to carry away the insoluble products. To minimize pumping losses the gap might be 0.035 inch or larger. One disadvantage of this scheme is that while the gap might be 0.035 inch at the start of discharge, it would enlarge to 0.050 inch by the end of discharge. The power capability of the battery would decrease throughout the discharge life and the power rating would have to be based on the larger gap near the end of discharge.

Another approach to the problem of dissolving thick zinc layers that is quite common in the prior art using immobilized electrolyte is to use a porous zinc structure to increase the true anode area for the same geometric area. In effect, the thickness of insoluble products is reduced by being spread over a larger area. However, the products are all contained between the electrodes. In order to maintain the physical integrity of the porous structure at the end of discharge, it is common practice to use a large excess of zinc, and utilization of only half the available zinc during a complete discharge is quite common. Considering the excess zinc required in the porous structure and the porosity of zinc to contain the electrolyte plus an insulating porous separator, anode thicknesses of 0.1 to 0.2 inch are typical. Thus, for this design the effective gap can be about 0.1 inch compared to about 0.05 inch for forced electrolyte flow and 0.005 inch for the tape of the present invention. Designs that require a large electrode spacing seriously limit the maximum current density that can be attained for a reasonable internal cell voltage drop as shown by the following examples, assuming an electrolyte resistivity of 2 ohm-inch in the equation shown previously, $E_e = \rho_a i$.

| System | Spacing, $g$, inch | Ohmic polarization voltage, $E_e$, at various current densities, $i$, at— | | |
|---|---|---|---|---|
| | | 0.5 amp/in.$^2$, volts | 2 amp/in.$^2$, volts | 6 amp/in.$^2$, volts |
| Static | 0.1 | 0.1 | 0.4 | 1.2 |
| Flow | 0.05 | 0.05 | 0.2 | 0.6 |
| Tape | 0.005 | 0.005 | 0.020 | 0.060 |

The above examples indicate that only the tape permits consideration of peak current density of 6 amp/in.$^2$ (864 amp/ft$^2$) without exceeding the available cell potential of the zinc/air couple as with the static system, and/or causing exorbitant voltage loss (power loss as internal cell heat) as with the flow system.

In the above example, the tape battery was selected to have a total anode to cathode area ratio of 15. A battery could be designed with four times the length of tape and the anode to cathode ratio would be 60 with no effect on peak power capability since the electrode spacing would still be 0.005 inch. Using the tape battery with larger energy content as a basis for comparison of spacing would have emphasized more forcefully the severe limitation on peak current density that results from cell designs of the prior art. This is the basis of the compromise that has existed previously in either designing a battery for large energy content but low peak power capability or high peak power capability but low energy content. Using the principles of the present invention, the designer can provide high energy content and peak power capability in the same rechargeable battery using a moving tape that offers little resistance to movement by avoiding sliding friction. Moreover, the peak power capability is essentially constant throughout the complete discharge cycle since the effective electrode spacing and ohmic polarization component do not change during discharge.

Electrolyte concentration could have a very wide range. Lower than 30 percent would be feasible although possibly not practical because of excess weight of the water carried on the tape and lower conductivity. About 20 to 40 percent would be the range for best conductivity, depending on operating temperature. Concentrations of 60 to 70 percent could be used and still be liquid at room temperature. However, one could consider up to 100 percent potassium hydroxide or sodium hydroxide as initially stored on the tape, and this would minimize tape weight. Water vapor could be adsorbed from highly humidified air fed to the air cathode. The exact concentration that would exist on the active electrolysis zone is difficult to specify since it would depend on air temperature, humidity, velocity, cathode configuration in relation to current density.

The fundamental technology and theoretical equations to describe the steady-state electrolyte concentration in a comparable electrochemical configuration involving heat and mass transfer is covered in the literature. See, for example, "Water-Vapor Electrolysis Cell with Phosphoric Acid Electrolyte," by J. E. Clifford, SAE Paper 670851, Oct. 1967. When the battery is recharged, water could be removed from the electrolyte depending again on the same variables. The electrolyte could become concentrated by evaporation of water (which is likely because of the heat in high current density charging) although the electrolyte might never again reach 100 percent KOH. (Up to 80 or 85 percent KOH might be possible, or until the electrolyte froze.) This mode of operation, which is unique for the present invention, means that the evaporation of water from the electrolyte will accomplish a degree of cooling. The latent heat of water evaporation from the electrolyte is a very efficient means of removing heat from electrochemical cells, which is very important for charging. Likewise, if water is absorbed into the electrolyte during discharge the temperature will be increased. This is good, too, since high temperature is desired in the active zone during discharge. This would be particularly advantageous for low-temperature startup of the cell, as on a cold morning. Just absorbing water vapor in concentrated KOH (60 to 70 percent) will produce heat of solution comparable in magnitude to latent heat of evaporation.

One of the unique advantages of the present invention is that only desired portions of the battery need be subject to the high temperatures that are most conducive to high battery efficiency during discharge. For example, to minimize self-discharge it is desirable to have electrolyte in contact with zinc be at low temperature (i.e., ambient air temperature) which is possible for the zinc stored on the reel. However, for maximum discharge power with efficient electrochemical utilization of zinc, it is desirable that the electrolyte in contact with the zinc be at high temperature (below the boiling point of the electrolyte) which is possible in the active electrolysis zone by control of the loss of $I^2R$ heat produced during discharge by limiting air flow past the cathode, preheating the air, adsorbing water-vapor into the electrolyte, or combinations of the above techniques. Thus, it is possible to simultaneously achieve both desired conditions relative to hot electrolyte in the active electrolysis zone and relatively cold electrolyte on the storage reel. The above advantage can be realized most effectively with an air cathode which operates most efficiently at high temperature.

A related advantage of the unique local temperature control possible with the present invention is the use of high electrolyte concentrations (i.e., higher than normally considered for the zinc/air couple). For example, a concentration of 75 wt. percent KOH would be a solid (or frozen) as stored on the reel. However, the heat of electrolysis in the active zone would liquify the electrolyte as it came in contact with rotating cathode. Liquid electrolyte is desired for high conductivity at the area of electrochemical discharge whereas the solidified electrolyte of very low conductivity is desired to limit self-discharge of zinc on the storage reel.

Of course, the above unique advantages of localized temperature control, electrolyte fluidity control, and electrolyte concentration control (water absorbtion/desorbtion) could be utilized with certain other electrochemical couples in addition to the zinc/air couple, and the preferred design in which the electrolyte is carried in an absorbent matrix as an integral part of the anode tape. A layer of electrolyte in an absorbent matrix could be provided on the cylindrical electrode, either in addition to or in place of the electrolyte layer on the tape electrode. Various forms of air cathode, other cathode and anode materials, electrolytes, and arrangements thereof (such as a tape cathode with a cylindrical anode) can be used, some of which are brought out in the summary of the invention.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:
1. A rechargeable current generating cell comprising:
a. a first electrode having cylindrical active surface,
b. a movable elongated member comprising
  i. a thin flexible conductive current collector,
  ii. a second electrode comprising a layer of active material on the collector, and
  iii. a layer of porous nonconductive material on the second electrode and saturated with an electrolyte,
c. means for positioning a portion of the elongated member adjacent the first electrode with the electrolyte layer contacting a substantial portion of the cylindrical active surface of the first electrode,
d. means for storing a substantial portion of the elongated member in regions away from the first electrode, and
e. means for moving the elongated member to progressively change the specific portion thereof that is positioned adjacent the first electrode.
2. A cell as in claim 1, wherein
f. the elongated member (b) comprises also a third electrode comprising a layer of active material on the opposite side of the collector (i) and a second electrolyte layer of porous nonconductive material on the third electrode and saturated with an electrolyte,
g. a fourth electrode having a cylindrical active surface is provided,
h. means are provided for positioning a portion of the elongated member adjacent the fourth electrode with the second electrolyte layer contacting a substantial portion of the cylindrical active surface of the fourth electrode, and
i. the moving means (e) also progressively changes the specific portion of the elongated member that is positioned adjacent the fourth electrode.
3. A cell as in claim 2, wherein the collector is wider than the second and third electrodes and electrolyte layers, and means are provided for making electrical connection to an exposed area on the collector.
4. A cell as in claim 1, wherein the moving means (e) rotates the first electrode so that it and the adjacent portion of the elongated member move together with no relative motion therebetween.
5. A cell as in claim 1, wherein the electrolyte layer is about 2 to 10 mils thick and is pressed snugly against the first electrode to provide close spacing between the first electrode and the adjacent portion of the second electrode.
6. A cell as in claim 1, wherein the collector consists essentially of a material that is electrochemically inert in the electrolyte.
7. A cell as in claim 3, wherein the electrical connection making means rotate with the first and fourth electrodes adjacent respective progressively changing portions of the exposed area on the collector and move together with said portions with no relative motion therebetween.
8. A cell as in claim 1, wherein the first electrode is a cathode and the second electrode is an anode.
9. A cell as in claim 2, wherein the first and fourth electrodes are cathodes and the second and third electrodes are anodes.
10. A cell as in claim 1, wherein the first electrode is an anode and the second electrode is a cathode.
11. A cell as in claim 2, wherein the first and fourth electrodes are anodes and the second and third electrodes are cathodes.
12. A cell as in claim 8, wherein the cathode comprises a gas-permeable member.
13. A cell as in claim 12, wherein a progressively changing portion of the cathode is positioned away from contact with the elongated member and means are provided for forcing a gas through said portion of the cathode to purge it.
14. A cell as in claim 1, comprising also means for supplying direct current between the first electrode and the flexible current collector, to charge the cell.
15. A cell as in claim 2, comprising also means for supplying direct current between the first and fourth electrodes and the flexible current collector, to charge the cell.
16. A cell as in claim 8, comprising also conductive means contacting the electrolyte layer in a region away from contact with the first electrode, and means for supplying direct current between the conductive means and the flexible current collector, to charge the cell.
17. A cell as in claim 9, comprising also first conductive means contacting the electrolyte layer (b) (iii) in a region away from contact with the first electrode, second conductive means contacting the second electrolyte layer in a region away from contact with the fourth electrode, and means for supplying direct current between both of the conductive means and the flexible current collector, to charge the cell.
18. A cell as in claim 9, wherein the positioning means (c) and (h) include a first cylindrical roller having a conductive surface contacting the electrolyte layer (b) (iii) and a second cylindrical roller having a conductive surface contacting the second electrolyte layer, and wherein means are provided for supplying direct current between both of the conductive surfaces and the flexible current collector, to charge the cell.
19. A cell as in claim 1, comprising also a layer of porous nonconductive material on the first electrode and saturated with an electrolyte.
20. A cell as in claim 1, wherein said electrolyte layer (b) (iii) is on the first electrode.
21. A cell as in claim 1, comprising also means for controlling the speed of movement of the elongated member.

22. A cell as in claim 21, wherein the control means continuously adjusts the speed of movement to provide preselected voltages across, and currents through, the cell over a range of settings of a command device.

23. A cell as in claim 22, wherein the control means includes a servomechanism.

24. A cell as in claim 21, wherein the control means is responsive to the instantaneous value of an electrical quantity of the cell to maintain the quantity at values selected as a function thereof and of adjustable settings of a command device.

25. A cell as in claim 1, wherein the moving means (e) drives the elongated member mostly in one direction when the cell is being discharged and in the opposite direction when it is being charged.

26. A cell as in claim 8, wherein, with the cell in a charged state, the electrolyte is alkaline, the active anode surface is selected from the group consisting of iron oxide, cadmium, and zinc, and the active cathode surface is selected from the group consisting of nickel oxide and silver oxide.

27. A cell as in claim 8, wherein, with the cell in a charged state, the electrolyte consists essentially of potassium hydroxide, and the active anode surface and the active cathode surface respectively is selected from the group consisting of iron oxide and nickel oxide; cadmium and silver oxide; and zinc and silver oxide.

28. A cell as in claim 8, wherein, with the cell in a charged state, the electrolyte consists essentially of sulfuric acid, the active anode surface consists essentially of lead, and the active cathode surface consists essentially of lead oxide.

29. A cell as in claim 8, wherein, with the cell in a charged state, the active anode surface consists essentially of zinc.

30. A cell as in claim 8, wherein, with the cell in a charged state, the active anode surface consists essentially of a coating of about 5 to 25 grams per square foot of zinc.

31. A cell as in claim 29, wherein the active cathode surface consists essentially of silver oxide.

32. A cell as in claim 30, wherein the active cathode surface consists essentially of a coating of about 10 to 50 grams of silver oxide per square foot of anode area.

33. A cell as in claim 32, wherein the electrolyte is an aqueous solution consisting essentially of at least about 30 percent potassium hydroxide.

34. A cell as in claim 32, wherein the electrolyte is saturated with zinc oxide.

35. A cell as in claim 30, wherein the flexible conductive member comprises a steel tape about 1 to 5 mils thick.

36. A cell as in claim 8, wherein the cathode comprises an air-permeable conductive member.

37. A cell as in claim 36, wherein the conductive member has catalytic material thereon.

38. A cell as in claim 8, wherein the cathode comprises a conductive screen and a catalyst thereon is selected from the group consisting of platinum and silver.

39. A cell as in claim 8, wherein the cathode comprises an air-permeable member, the active material consists essentially of zinc, and the electrolyte consists essentially of potassium hydroxide.

40. A cell as in claim 39, wherein the cathode consists essentially of porous carbon.

41. A cell as in claim 40, wherein the spacing between the cathode and the anode, as determined by the electrolyte layer, is less than about 25 mils.

42. A cell as in claim 10, wherein, with the cell in a charged state, the electrolyte is alkaline, the active anode surface is selected from the group consisting of iron oxide, cadmium, and zinc, and the active cathode surface is selected from the group consisting of nickel oxide and silver oxide.

43. A cell as in claim 10, wherein, with the cell in a charged state, the electrolyte consists essentially of potassium hydroxide, and the active anode surface and the active cathode surface respectively is selected from the group consisting of iron oxide and nickel oxide; cadmium and silver oxide; and zinc and silver oxide.

44. A cell as in claim 10, wherein, with the cell in a charged state, the electrolyte consists essentially of sulfuric acid, the active anode surface consists essentially of lead, and the active cathode surface consists essentially of lead oxide.

45. A cell as in claim 10, wherein, with the cell in a charged state, the active anode surface consists essentially of zinc.

46. A cell as in claim 10, wherein, with the cell in a charged state, the active anode surface consists essentially of a coating of about 5 to 25 grams of zinc per square foot of cathode area.

47. A cell as in claim 45, wherein the active cathode surface consists essentially of silver oxide.

48. A cell as in claim 46, wherein the active cathode surface consists essentially of a coating of about 10 to 50 grams per square foot of silver oxide.

49. A cell as in claim 48, wherein the electrolyte is an aqueous solution consisting essentially of at least about 30 percent potassium hydroxide.

50. A cell as in claim 49, wherein the electrolyte is saturated with zinc oxide.

51. A cell as in claim 48, wherein the flexible conductive member comprises a steel tape about 1 to 5 mils thick.

52. A cell as in claim 10, wherein the cathode comprises an air-permeable conductive member.

53. A cell as in claim 52, wherein the conductive member has catalytic material thereon.

54. A cell as in claim 10, wherein the cathode comprises a conductive screen and a catalyst thereon is selected from the group consisting of platinum and silver.

55. A cell as in claim 10, wherein the cathode comprises an air-permeable member, the active anode material consists essentially of zinc, and the electrolyte consists essentially of potassium hydroxide.

56. A cell as in claim 55, wherein the cathode consists essentially of porous carbon.

57. A cell as in claim 56, wherein the spacing between the cathode and the anode, as determined by the electrolyte layer, is less than about 25 mils.

* * * * *